June 7, 1949.  J. J. BOULIN  2,472,142
TENSIOMETER
Filed Nov. 8, 1946
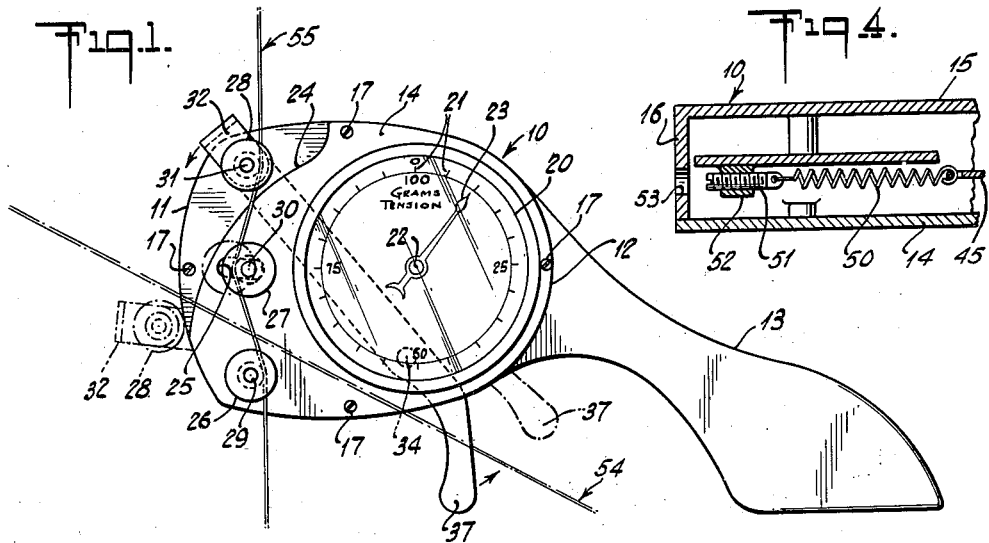
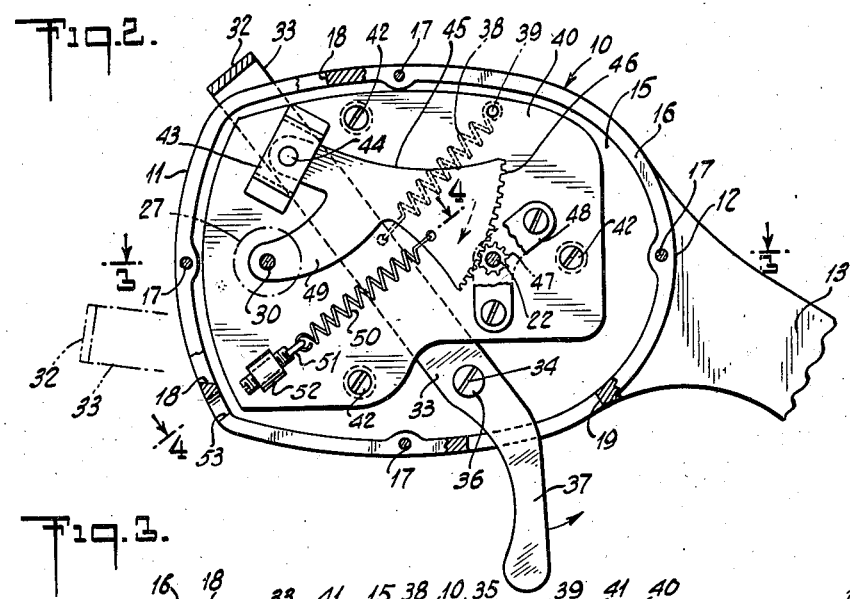
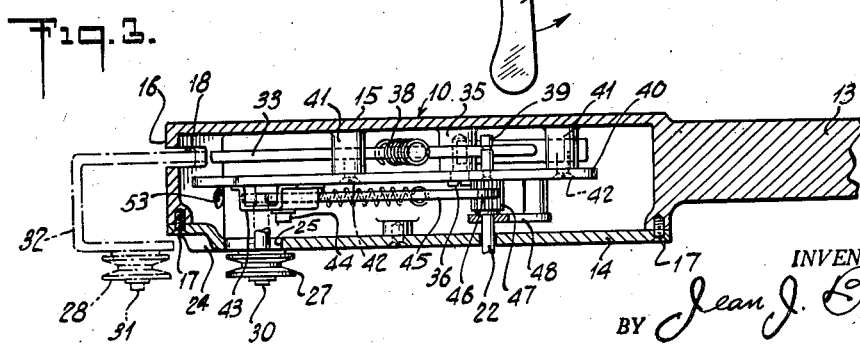
INVENTOR.
Jean J. Boulin
BY Watson, Bristol, Johnson & Leavenworth
ATTORNEYS.

Patented June 7, 1949

2,472,142

UNITED STATES PATENT OFFICE 2,472,142

TENSIOMETER

Jean J. Boulin, Chatham, N. J., assignor to Boulin Instrument Corporation, New York, N. Y., a corporation of New York Application November 8, 1946, Serial No. 708,718

5 Claims. (Cl. 73—144)

The present invention relates to tensiometers for measuring the tension in running yarns, threads, filaments, and the like, of the type embodied in a relatively small self-contained instrument adapted to manual manipulation.

A general object of the present invention is to provide such a tensiometer, which is compact and of simple mechanical construction, readily and economically producible on a commercial scale and which is so constructed as to permit its manipulation by one hand of the operator, particularly where little space for instrument manipulation is available as in modern textile machinery, whereby pulley means thereof may be manipulated in a simple manner to permit location and draft of a running yarn, or the like, with respect thereto so that it will be effectively trained back and forth between such pulley means for exerting, while running, a force on certain of said pulley means so correlated to the tension thereof as to give a definite tension measurement indication or reading on an indicator forming a part of the instrument.

A more specific object of the present invention is to provide such a tensiometer instrument with a pistol grip and a trigger whereby the instrument may be conveniently held in one hand with the trigger cocked and the latter may be pulled by a finger so as to manipulate certain pulley means with respect to other pulley means whereby a running yarn, or the like, may be readily drafted and located therebetween, in a manner to permit its training back and forth between the pulley means when the trigger is released so that tension of the running yarn can be measured on an indicator of the instrument in response to movement of certain of the pulley means resulting from force thereagainst of the tensioned running yarn trained thereover, with all of the pulley means being located substantially in the same plane at all times.

Another object of the present invention is to provide in such an instrument a frame structure holding the various parts thereof and having a pistol grip joined thereto, either as an integral part thereof or as a separate piece attached thereto, with the instrument provided with at least three yarn-engaging pulleys arranged in a bank so that the yarn may be trained to one side of the two outside pulleys and to the opposite side of the intermediate pulley, with the latter adapted to operate indicator mechanism for measuring tensioning force of the running yarn, one of the outside pulleys being rotatably mounted to the frame on a fixed axis and the other of the outside pulleys being rotatably carried by movable structure mounted on the frame and operated by the trigger so that a pull on the latter will move that pulley toward the fixed axis pulley past the intermediate pulley for ready location and draft of the running yarn between the latter and the two outside pulleys, whereby upon release of the trigger the pulleys will again be arranged in the bank with the running yarn trained in the indicated manner therebetween.

A further object of the present invention is to provide a structural embodiment of the device which is readily constructed and permits efficient use and operation thereof.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

Fig. 1 is a side elevational view of an embodiment of the tensiometer instrument of the present invention, showing in full lines thereon the position of the topmost pulley and its supporting arm mounted for transitory operation to aid in threading yarn for measuring tension therein, and in dot-dash lines another position of that pulley and its supporting arm when "cocked" for accomplishing such threading;

Fig. 2 is an enlarged elevational section, with parts broken away, of the instrument shown in Fig. 1;

Fig. 3 is a top plan view of the mechanism housed in the casing of the instrument shown in Figs. 1 and 2 with the casing being sectioned approximately along line 3—3 of Fig. 2, and with parts broken away; and Fig. 4 is an enlarged detailed section taken substantially on line 4—4 of Fig. 2, with parts broken away.

In the embodiment shown by way of example in the drawing, the tensiometer instrument of the present invention may comprise a frame or casing 10 having a forward end 11, a rearward end 12 and a pistol grip 13 fixed to or made integral with the rearward end. The casing 10 also preferably comprises a face plate 14 and a back plate 15. Preferably the back plate 15 has side flange structure 16 made integral therewith which spaces the face plate 14 therefrom with the latter secured thereto in any suitable manner, such as by means of screws 17—17. The resulting hollow casing 10 is adapted to house certain mechanism hereinafter described and the side flange 16 thereof is preferably slotted in the forward end, such as at 18, and in the bottom, such as at 19, to accommodate certain pulley transitory supporting mechanism and trigger means hereinafter described.

On the face plate 14 of the casing 10 is provided certain indicating means which may be in the form of a dial 20 carrying a series of force units indicia 21, such as graduation and number marks to indicate tension in grams or ounces. The face plate 14 also has a hole therein, substantially central of the dial 20, through which an end of a pointer shaft 22 extends to carry exteriorly of the dial an indicator, such as pointer 23, so that as the shaft 22 is rotated the pointer 23 will traverse the dial 20 to indicate tension in any desired units of force, such as grams.

As shown in Figs. 1 and 3, the face plate 14 is recessed at 24 along the arc of a circle adjacent the forward end 11 of the casing 10 so as to provide for freedom of action of certain lever structure hereinafter described. The face plate 14 also has therein adjacent the forward end 11 of the casing a through arcuate slot 25 to permit certain swinging action of pulley and pointer operating mechanism.

By way of example, a bank of three pulleys 26, 27 and 28 is preferably mounted on the face of the instrument. The lowest, or bottom, pulley 26 is rotatably mounted on a stub shaft 29 fixed to the face plate 14 so that the axis of that pulley is in a fixed position. The intermediate, or middle, pulley 27 is rotatably mounted on a stub shaft 30 which extends through the slot 25 to the interior of the casing. The uppermost, or top, pulley 28 is rotatably mounted on a stub shaft 31 in turn supported on reversely bent end 32 of a lever arm 33 pivotally supported in the casing and extending therefrom through slot 18. The recess 24 in the face plate 14 accommodates the reversely bent end 32 of the lever 33 so that all of the pulleys 26, 27 and 28 in the bank may have their grooves located substantially in the same vertical plane and the top pulley 28 may be swung from the full line position to the dot-dash line position shown in Fig. 1.

The lever 33 is preferably of the first class and may be fulcrumed at 34 to the back plate 15 of the casing 10 by means of a land 35 having in internally threaded socket threadably receiving a screw 36, the shank of which is loosely received through a hole in the lever. End 37 of lever 33, beyond and below fulcrum point 34, extends through slot 19 in casing flange 16 and is so shaped as to serve as a trigger member. The upper free end 32 of lever 33 is spring-biased upwardly to the full line position shown in Figs. 1 and 2, by means of a helical spring 38, having one end fixed to the lever and its other end anchored to a pin 39 mounted on the rear side of a frame plate 40. Frame plate 40 is supported in the casing 10 on lands 41—41, preferably made integral with the back plate 15, and provided with internally threaded sockets threadably receiving screws 42—42.

The frame plate 40 in the casing 10 carries a U-shaped strap or bridge 43 which, with the frame plate, supports a pin or shaft 44 on which is pivotally mounted a gear sector 45 having a series of teeth 46 meshed with a pinion 47 fixed on pointer shaft 22. The pointer shaft 22 is rotatably supported by the frame plate 40 and a bracket 48 fixed thereto in spaced-apart relation and between which the pinion 47 is located.

The gear sector 45 has an arm 49 on which is mounted the stub shaft 30, projecting through the slot 25 in casing face plate 14 rotatably supporting therebeyond the middle pulley 27. As a result, gear sector 45 may be pivoted about the pin 44 a limited distance, as permitted by the slot 25 and pulley shaft 30 which extends through the slot to move freely back and forth therein. Gear sector 45 is spring-biased to one position with the pulley shaft 30 at the far end of slot 25, preferably by means of a helical spring 50 having one end anchored to the gear sector and the other end fastened to a tensioning screw 51 threadably received in an internally threaded eyelet 52 fixed on frame plate 40. An access hole 53 in flange 16 of the casing is in line with the slotted end of tensioning screw 51, as shown in Figs. 2, 3 and 4, to permit passage of a screw driver to the screw so that the latter may be turned as desired to adjust the tension of biasing spring 50.

In operation of the embodiment of the invention shown in the drawing, the operator holds the instrument in one hand grasping the pistol grip 13 in the recognized manner. He then, with a finger, pulls rearwardly on trigger 37 moving it from the full line position shown in Fig. 1 to the dot-dash line position. This swings the free end 32 of the lever 33 downwardly or counter-clockwise, from its full line position to the dot-dash line position carrying with it the uppermost, or top, pulley 28 past the intermediate, or middle, pulley 27 so that the running yarn, thread, or the like, indicated in dot-dash lines at 54 in Fig. 1, may be positioned between the middle pulley 27 and the other two pulleys 26 and 28. The operator then releases the trigger 37 to permit its biasing spring 38 to return, or tend to return, the lever 33 and pulley 28 carried thereby substantially to the full line position shown in Fig. 1. In doing so the operator manipulates the instrument so that it assumes the full line position shown in Fig. 1 relative to the running yarn, which is indicated in full lines at 55, with the running yarn drafted and trained back and forth between the lower first pulley 26, the second, or middle pulley 27 and the the third, or top, pulley 28. As a result the running yarn 55 is trained between the three pulleys to run on the near sides of the bottom and top pulleys 26 and 28 and on the far side of the middle pulley 27. The effect of the biasing spring 38 on lever 33 and the top pulley 28 carried thereby is much greater than the biasing effect of spring 50 on gear sector 45 and the middle pulley 27 carried thereby, so that tension in the entrained yarn 55 effectively will move the middle pulley 27 backward with its shaft 30 protruding through for free backward movement in slot 25 to rotate the gear sector 45 counter-clockwise to a position such as that indicated in full lines in Fig. 2. The series of teeth 46 of gear sector 45 rotate pinion 47 and pointer shaft 22 to move pointer 23 around the dial to some position, such as that indicated in full lines in Fig. 1, so as indicia thereon will indicate the tension in the running yarn in, for example, grams.

This manipulation of the instrument to thread the yarn for giving a tension indication or reading on the dial is somewhat in the nature of rotating the casing thereof clockwise. The hand which grasps the pistol grip 13 is canted downwardly so that the instrument is in a position which may be termed "drooping," then with pull on the trigger the running yarn is positioned relative to the pulleys, as indicated in dot-dash lines in Fig. 1. With release of the trigger, the grasping hand is swiveled upwardly at the wrist to bring the instrument to a position substantially that indicated in full lines in Fig. 1, so that the top pulley can move to the full line position to cooperate with the bottom pulley in applying the yarn tension to the middle pulley which is to operate the indicating means.

It will thus be seen that the instrument is easily manipulated by one hand, which has proven to be a great advantage, particularly because of lack of appreciable clearance space in modern textile machinery.

Thus it will be readily understood that the objects set forth above, among others made apparent in the preceding description, are efficiently attained and, since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A one-hand tensiometer for measuring the tension in running yarns and the like comprising, in combination, a frame having forward and rearward ends, a pistol grip joined to said frame and extending from the rearward end thereof, an upwardly extending bank of at least three rotatable pulley means always located substantially in the same plane and in the vicinity of the forward end of said frame, fixed axis means rotatably mounting the first and lowest of said pulley means on said frame, movable means rotatably supporting the second and intermediate pulley means on said frame, means biasing said movable means to a forward position while permitting it to be moved rearward under running yarn tension, indicating means on said frame comprising a series of force units indicia, indicator means for traverse of said indicating means, means for causing said indicator means to respond to movement of said movable means, a member pivotally mounted on said frame and having a free end in the vicinity of the forward end of the latter and a trigger extending below said frame forward of said grip for engagement by a finger of a hand grasping said grip, means biasing the free end of said member upwardly with said trigger in a forward cocked position whereby the free end of said member may be swung downwardly past said second pulley means to a position therebelow with rearward pull on said cocked trigger, and means rotatably supporting the third and highest pulley means on the free end of said member to be carried therewith to below said second pulley means with pull on said trigger to permit location and draft of a running yarn between said second pulley means and said first and third pulley means whereby the running yarn will be trained back and forth between said first, second and third pulley means with release of said trigger.

2. A one-hand tensiometer for measuring the tension in running yarns and the like comprising, in combination, a frame having a face and back and forward and rearward ends, a pistol grip joined to said frame and extending from the rearward end thereof, an upwardly extending bank of at least three rotatable pulley means always located substantially in the same plane substantially parallel to said face and in the vicinity of the forward end of said frame, fixed axis means rotatably mounting the first and lowest of said pulley means on the face of said frame, movable means rotatably supporting the second and intermediate pulley means on the face of said frame, means biasing said movable means to a forward position while permitting it to be moved rearward under running yarn tension, indicating means on the face of said frame between said second pulley and said pistol grip and comprising a series of force units indicia, indicator means movably mounted on said frame for traverse of said indicating means, means for causing said indicator means to respond to movement of said biased movable means, a lever arm of the first class pivotally mounted on said frame and having a free end in the vicinity of the forward end of the latter and a trigger extending below said frame forward of said grip for engagement by a finger of a hand grasping said grip, means biasing the free end of said arm upwardly with said trigger in a forward cocked position whereby the free end of said arm may be swung downwardly past said second pulley means to a position therebelow with rearward pull on said cocked trigger, and means rotatably supporting the third and highest pulley means on the free end of said arm to be carried therewith to below said second pulley means with pull on said trigger to permit location and draft of a running yarn between said second pulley means and said first and third pulley means whereby the running yarn will be trained back and forth between said first, second and third pulley means with release of said trigger.

3. A one-hand tensiometer for measuring the tension in running yarns and the like comprising, in combination, a casing having a pistol grip joined thereto, an upwardly extending bank of three rotatable pulleys always located substantially in the same plane, means rotatably supporting the lowest pulley in a fixed position on the face of said casing, movable means rotatably supporting the intermediate pulley at the face of said casing for movement toward said grip, means biasing said last-named means to a forward position, a dial on the face of said casing between said intermediate pulley and said grip and comprising a series of force units indicia, a pointer for traverse of said dial, mechanism for causing said pointer to respond to movement of said means supporting said intermediate pulley, a lever arm pivotally mounted on said casing having a free end extending forward beyond the latter to be swung down past said intermediate pulley, a trigger mounted on said arm and extending below said casing forward of said grip for finger engagement, means biasing the free end of said arm to an upward position with said trigger in a forward cocked position, and means rotatably supporting the highest pulley on the free end of said arm.

4. A one-hand tensiometer for measuring the tension in running yarns and the like comprising, in combination, a casing having a front face and a back, a pistol grip joined to said casing, an upwardly extending bank of three rotatable pulleys always located substantially in the same plane forward of said casing face, means rotatably supporting the lowest pulley in a fixed position on the face of said casing, a member pivoted in said casing, means mounted on said member extending through a slot in said casing face and rotatably supporting the intermediate pulley for arcuate movement between a forward position and a rearward position, means biasing said member to its forward position, a dial on the face of said casing between said intermediate pulley and said grip and comprising a series of force units indicia, a pointer for traverse of said dial, mechanism in said casing for causing said pointer to respond to movement of said means supporting said intermediate pulley, a lever arm pivotally mounted on said casing having a free end extending forward beyond the latter to be swung down past said intermediate pulley, a trigger mounted on said arm and extending below said casing forward of said grip for finger engagement, means biasing the free end of said arm to an upward position with said trigger in a forward cocked position, and means rotatably supporting the highest pulley on the free end of said arm.

5. A one-hand tensiometer for measuring the tension in running yarns and the like comprising, in combination, a hollow casing having forward and rearward ends and front and back faces, a pistol grip joined to the rearward end of said casing, an upwardly extending bank of three rotatable pulleys always located substantially in the same plane substantially parallel to and in front of the face of said casing and in the vicinity of the forward end of the latter, means rotatably supporting the lowest pulley in a fixed position on the face of said casing, a gear sector pivotally mounted in said casing, a stub shaft mounted on said sector extending through an arcuate slot in said casing face and rotatably supporting the intermediate pulley for arcuate movement between a forward position and a rearward position, spring means biasing said sector with its stub shaft to the forward position, a dial on the face of said casing between said intermediate pulley and said grip and comprising a series of force units indicia, a pointer shaft pivotally mounted in said casing and carrying thereon a pinion meshed with said gear sector, said pointer shaft having an end extending out through a hole in said casing face, a pointer for traverse of said dial fixed on the end of said pointer shaft, a lever arm of the first class pivotally mounted in said casing having a free end extending forward through a slot in and beyond the forward end of said casing to be swung down past said intermediate pulley, means on the free end of said arm rotatably supporting the highest pulley, a trigger mounted on said arm and extending through a slot in and below the bottom of said casing forward of said grip for finger engagement, and means biasing the free end of said arm to an upward position with said trigger in a forward cocked position.

JEAN J. BOULIN.

REFERENCES CITED

The following references are of record in the file of this patent:

UNITED STATES PATENTS

| Number | Name | Date |
|---|---|---|
| 1,650,603 | Burton | Nov. 29, 1927 |
| 2,285,471 | Sturgess | June 9, 1942 |
| 2,372,434 | Krouse | Mar. 27, 1945 |
| 2,403,799 | Holton | July 9, 1946 |